Figure 1:
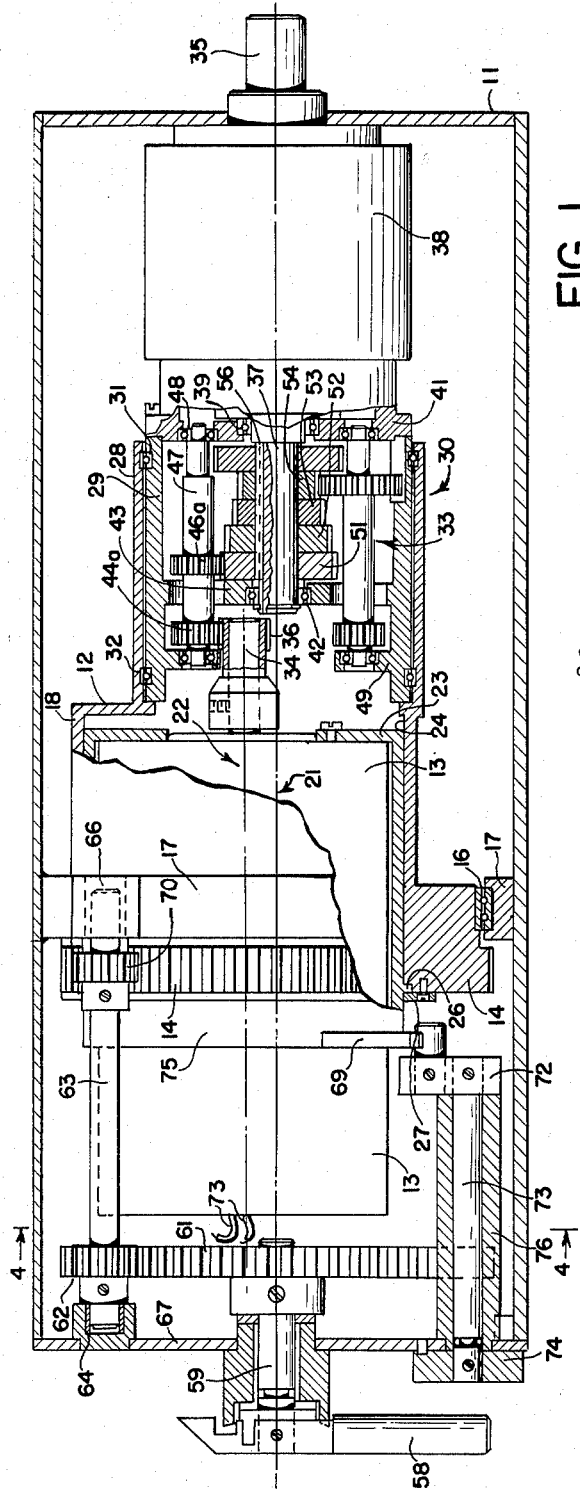

March 22, 1966  F. R. GRIMM  3,241,384
VARIABLE SPEED DRIVE
Filed Oct. 30, 1963  2 Sheets-Sheet 1

INVENTOR.
FORREST R. GRIMM
BY
ATTORNEY

March 22, 1966  F. R. GRIMM  3,241,384
VARIABLE SPEED DRIVE

Filed Oct. 30, 1963  2 Sheets-Sheet 2

INVENTOR.
FORREST R. GRIMM
BY Harold D. Jastrem
ATTORNEY

United States Patent Office 3,241,384
Patented Mar. 22, 1966

3,241,384
VARIABLE SPEED DRIVE
Forrest R. Grimm, Minneapolis, Minn., assignor to
General Mills, Inc., a corporation of Delaware
Filed Oct. 30, 1963, Ser. No. 320,007
7 Claims. (Cl. 74—353)

This invention relates to a variable speed drive, and more particularly to an improved variable speed drive of the electromechanical type.

Conventional types of speed reducers utilize a shifting mechanism which involves a conventional sliding gear and a shifting fork. In this type of shifting mechanism, the teeth of meshing gears are brought together by moving one or more of the gears along its own axes and parallel to the axes of the other gear so that the teeth of the respective gears are meshed by parallel axial movement. Such a shifting mechanism requires a complex synchronizing mechanism to insure that the gears do not engage each other while they are being meshed. These rather complicated methods are not particularly adaptable to mechanisms where a speed reducer is used to operate machines such as grinding mills for reducing particle size of materials, production of powdered biological material, and similar such mechanisms.

Accordingly, it is an object of the present invention to provide a new and improved variable speed drive.

It is a further object of the present invention to provide a new and improved variable speed drive of the electromechanical type.

It is another object of the present invention to provide a variable speed drive of the electromechanical type having a simple gear shift mechanism.

Another object of the present invention is to provide a variable speed drive for operating a powdered material disseminator.

Another object of the present invention is to provide a new and improved variable speed drive of the electromechanical type wherein gears are synchronized by taking advantage of the natural taper of the ends of the gear teeth.

A yet further object of the present invention is to provide a new and improved variable speed drive utilizing a cluster of speed reducing gears.

A further object of the present invention is to provide a new and improved variable speed drive wherein an electric motor is moved in a prescribed path to engage a selected gear train to drive an output shaft at a predetermined speed.

Another object of the present invention is to provide a new and improved variable speed drive wherein an electrical motor is moved so that its axis follows a circular path to carry the motor into engagement with predetermined gear trains.

With these and other objects in view, the present invention contemplates a motor eccentrically mounted in a housing. The housing moves the motor about the axis of the housing so that the motor engages a predetermined idler gear. The idler gear is one of a cluster of gears arranged for engagement with the drive motor. The output of the entire speed reducer system is determined by the particular idler gear which is engaged by the motor. The motor is moved to a predetermined position by an indexing device adapted to rotate the housing which controls the position of the motor.

Figure 2:
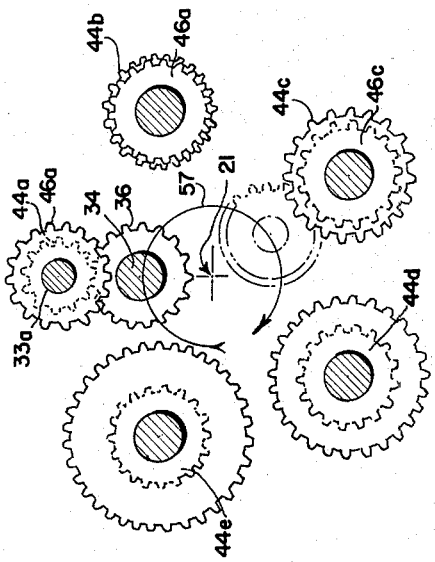
Figure 3:
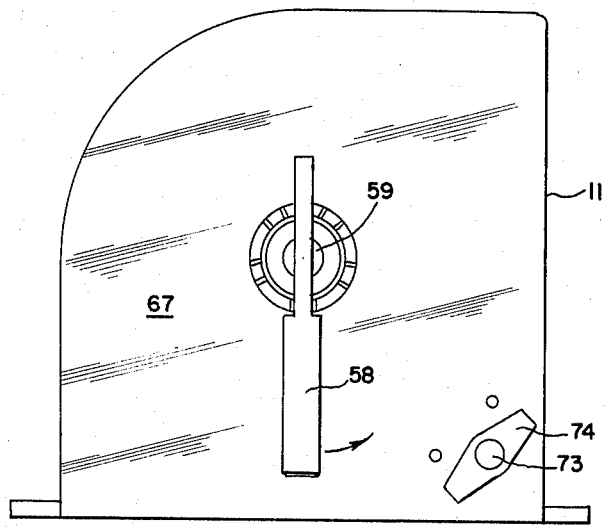
Figure 4:
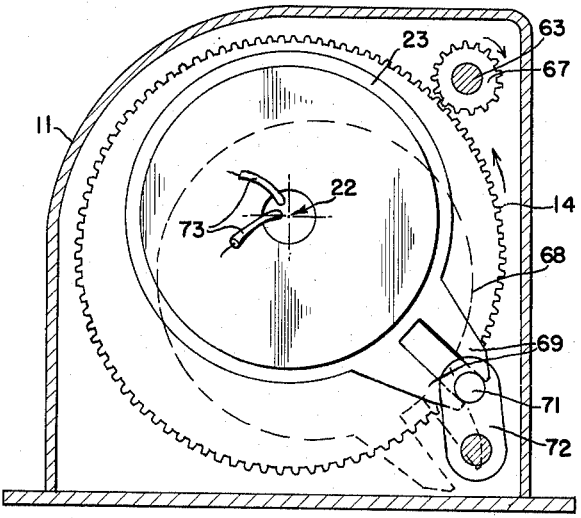

Other objects and advantages of the invention may be readily ascertained from the following detailed description when considered in conjunction with the accompanying drawings wherein:

FIGURE 1 is a cross sectional view showing the indexing mechanism, motor, and gear systems utilized in a variable speed drive, FIGURE 2 is a schematic diagram as viewed from the right side of FIGURE 1 showing the placement of gears which engage a motor pinion, FIGURE 3 is a left end view of FIGURE 1 showing the location and index positions of an indexing device, and FIGURE 4 is a view taken along lines 4—4 of the device shown in FIGURE 1 and showing a synchronizing device.

Refer first to FIGURE 1 of the drawings. The entire speed reducer is contained within a housing 11 which is sufficiently rigid so that it may act as a mounting block for various elements of the speed reducer. Within housing 11 is a sleeve 12 which is adapted to carry a motor 13. Sleeve 12 includes a spur gear 14 which may be an integral part of the sleeve 12 and is located or mounted at the left end of the sleeve as viewed in FIGURE 1. The sleeve 12 is mounted on bearings 16 which are mounted on an annular mounting block 17. Mounting block 17 follows the inside dimensions of the housing 11 to secure the sleeve 12 within the housing 11 and away from the walls thereof.

Sleeve 12 contains essentially two portions. The motor portion 18 is eccentrically positioned with respect to the gear 14. This can be observed by noting the relationship between the top of the motor portion 18 in FIGURE 1 with respect to the gear 14 and the location of the lower wall of portion 18 with respect to the lower portion of gear 14 in FIGURE 1. The motor portion 18 is eccentrically mounted with respect to the gear 14 as shown in FIGURE 4 of the drawings.

Gear 14 has a center axis of rotation 21 whereas the motor portion 18 of the sleeve 12 has an axis which coincides with the central axis 22 of a motor 13 and which is mounted within the motor portion 18.

The motor housing 23 slidably engages wall 24 and slides along this wall 24. The motor or motor housing 23, if a housing is needed, is made small enough to insure that the motor does not rotate with sleeve 12. A flange 26 is secured by a ring 27 so that the motor 13 is prevented from moving parallel to its own axis. The ring 27 is bolted to the gear 14. The ring 27 secures the flange 26 so that the fitting between the parts is very loose thus the motor does not rotate about its own axis while the sleeve 18 is rotating about its axis 22.

Sleeve extension 28 has a center of rotation about axis 21. Extension 28 is adapted to enclose a gear housing 29. Bearings 31 and 32 are mounted between the extension 28 and the gear housing 29 in order to provide adequate movement between these members. The gear system generally designated by the numeral 30 is a gear shift system designed to alter the output rotational speed at the shaft 35. The gear system 30 has a number of idler gear systems 33 which form a cluster about axis 21. Refer now to FIGURE 2 of the drawings. A motor pinion 36 is mounted on drive shaft 34 of motor 13. This pinion 36 is adapted to selectively engage an input gear in each of the idler systems. An output gear of each of the idler systems engages one of a number of spur gears mounted on shaft 37.

The shaft 37 is connected directly to the output shaft 35 or it may be connected into a planetary system 38. The particular application of the speed reducer will to some extent determine the need for a planetary system and the type of planetary system or other gear system which might be utilized between the shaft 37 and the output shaft 35. Shaft 35 and 37 may be the same shaft in applications where no intervening gear system is necessary. The shaft 37 is mounted by bearings 39 in an end plate 41 which is bolted to the housing 29. The other end of the shaft 37 is mounted on bearings 42 which are mounted in a web 43 of the housing 29. This web is an integral part of the housing 29.

Each of the idler systems contains an input gear 44 (individually gears 44a to 44e) and an output gear 46 (individually gears 46a to 46e) which are mounted on a shaft 47 (individually gears 47a to 47e). Each shaft 47 is mounted for rotation. One end of the shaft 47 is mounted on a bearing 48 which in turn is mounted in end plate 41. The other end of the shaft 47 is mounted on a bearing which is mounted in an annular flange 49. Annular flange 49 is an integral part of the housing 29. Each of the input gears' 44a to 44e is mounted in a common plane so that the pinion 36 can engage each of the input gears 44a to 44e (see FIGURE 2 of the drawings) without the need for axial adjustment of the location of the pinion 36. In other words, input gears 44a to 44e are all positioned in a common plane with pinion 36.

Each of the idler systems 33 also contain the output gears 46a to 46e respectively which are located on the respective shafts so that they will engage predetermined spur gears 51, 52, 53, 54 and 55. These spur gears 51 through 55 are mounted on shaft 37 (which may be the output shaft) by a pin 56 which fits into a groove in a shaft 37. The gears 51 through 55 are of a predetermined diameter so that a predetermined output from shaft 35 will occur depending upon which of the shafts 51 through 55 is being driven by the associated idler system.

Assume that the motor 13 is positioned so that the pinion 36 is in engagement with the input gear 44a. Referring to FIGURE 2 of the drawings, it is noted that the pinion 36 engages the uppermost idler system 33a. The output gear 46a of this system is in engagement with the gear 51. The motor operates the idler system 33a and drives the shaft 37 through the gear 51 thus producing an output at shaft 35. The output r.p.m. depend on the relationship of the gears in idler system 33a to the gear 51 which in turn depends upon the speed of rotation of the shaft 34. The rotational speed of the shaft 34 is a constant speed. Thus it can be seen that motor 13 selectively drives the shaft 35 through the individual idler gear systems 33.

Assume that a different output speed of rotation for shaft 35 or 37 is desired than that produced when the motor 13 is located in the position illustrated in FIGURES 1 and 2. Assume, for instance, that the proper rotational speed can be achieved by connecting the motor pinion 36 to the idler system which involves gears 44c and 46c (see FIGURE 2 of the drawings). In this event, the motor 13 must be moved in the arrow direction 57 so that the pinion 36 engages input gear 44c. To accomplish this movement a shift lever 58, see FIGURE 3 of the drawings is rotated in the counterclockwise direction. Shift lever 58 is connected to a shaft 59 which drives a large gear 61. This gear likewise rotates in the counterclockwise direction as viewed in FIGURE 4 and engages a smaller gear 62. The smaller gear 62 is mounted on a shaft 63 which is mounted on friction bearings 64 and 66. The bearing 64 is mounted in an end plate 67 of the housing 11. The bearings 66 at the other end of the shaft 63 is mounted in mounting block 17. A second small gear 70 is mounted at the end of shaft 63 which is nearest the mounting block 17 and is rotated with the shaft 63. This small gear 70 engages gear 14 which forms a part of the sleeve 12.

Rotation of gear 14 in the counterclockwise direction as viewed in FIGURE 4 of the drawings moves sleeve 12 about axis 21. Since axis 21 is eccentric with respect to the motor axis 22, the motor will change position with rotation of gear 14. This change of position is illustrated by the dotted lines 68 in FIGURE 4. Although the entire sleeve 12, including the end portion 18 and portion 28, rotate with the gear 14, the motor 13 does not rotate about its own axis since the motor housing 23 slides within the end portion 18. Consequently, the eccentrically mounted motor 13 and motor housing 23 are displaced so that the axis of the motor follows a path scribed by the circle 57, see FIGURE 2. This places the location of the motor housing and motor 13 at the position illustrated by the dotted line 68 in FIGURE 4. In this position the motor pinion 36 engages the input gear 44c so that the gear ratio through the gear system 30 is changed. Operation of the motor now results in a change in the speed of the output shaft 35.

In order to prevent the motor 13 and the motor housing 23 from rotating about the motor axis 22, the motor housing 23 is provided with a pair of ears 69. These ears engage a pin 71 which is part of a crank 72 (see FIGURES 1 and 4). A shaft 73 connects the crank 72 to an indexing lever 74 which is mounted in the end plate 67 of housing 11. This shaft 73 is mounted within a sleeve 76 which in turn is rigidly connected to the end plate 67. This prevents the axis of the shaft 73 from moving.

The crank 72 performs several functions. First, the pin 71 prevents the housing 23 and motor 13 from rotating about the motor axis 22 when the motor 13 is moved to a different location. Even though the housing 23 is designed to slide freely within the end portion 18 of sleeve 12, the friction involved between the parts will tend to rotate the motor 13. The pin 71 which engage ears 69 prevents this rotation about the axis 22.

Further the pin 71 prevents the motor from rotating about its own axis due to the torque developed by the motor 13. Without some means of overcoming the torque developed by the motor, the motor would simply rotate on its own axis and no output would occur at the shaft 34.

The crank 72 performs one additional function. When the pinion 36 is moved into engagement with an input gear such as gear 44c there is a possibility that the ends of the teeth of pinion 36 will engage the ends of the teeth on the input gear 44c thus preventing the gears from meshing. In this event a slight rotation of the motor and pinion 36 about the motor axis will permit the pinion 36 and the gear 44c to mesh. Consequently, lever 74 is provided to rotate the motor 13 about its axis to mesh the gears. When the lever 74 is rotated, for instance, in the clockwise direction as viewed in FIGURE 3, the pin 71 also rotates in the clockwise direction as viewed in FIGURE 4 with the result that the ears 69 are rotated counterclockwise as viewed in FIGURE 4. This rotates the housing 23 and motor 13 in the counterclockwise direction about the motor axis 22, thus meshing the pinion 36 with the input gear 44c. When this is accomplished, the motor 13 can be energized to produce a predetermined rotational speed at shaft 35.

It should be noted that since the motor 13 and the housing 23 do not rotate about the axis 22, the power lines 73 for the motor 13 may be connected directly to the motor. Since there is no rotation of the motor about its own axis, no problem of twisted power lines 73 is encountered thus resulting in a simplified method for energizing the motor 13.

It is to be understood that the above described arrangements are simply illustrative of the application of the principles of the invention. Numerous other arrangements may be devised by those skilled in the art which will embody the principles of the invention and which will fall within the spirit and scope thereof.

Now, therefore I claim:

1. A variable speed drive which comprises a cylindrical sleeve, a gear at one end of said sleeve with the rotational axis of said gear eccentrically located with respect to the longitudinal axis of said sleeve, a motor movably mounted within said sleeve, means attached to said motor to prevent said motor from rotating when said sleeve is rotated, an output shaft, at least two idler gear systems for interconnecting said motor and said output shaft and arranged to successively engage said motor, and means connected to said gear for rotating said sleeve to carry said motor into successive engagement with a selected individual idler gear system.

2. A variable speed drive which comprises a housing, a gear rotatably mounted within said housing, a cylindrical sleeve eccentrically mounted on said gear with respect to the rotational axis of said gear, a motor mounted within said sleeve and with the outer surface of said motor adapted to slide with respect to the inner surface of said sleeve, an output shaft, a plurality of idler gear systems for interconnecting said motor and said output shaft and arranged to successively engage said motor, each of said idler systems having its rotational axis parallel to the rotational axis of said motor, and a gear system for rotating said gear to carry said motor in a circular path around the rotational axis of said gear to place the motor into successive engagement with a selected individual idler gear system.

3. A variable speed drive in accordance with claim 2 which further includes means connected to said motor for rotating said motor about its own axis to insure positive engagement of said motor with said idler gear systems.

4. A variable speed drive in accordance with claim 2 which further includes a series of axially aligned gears mounted on a common shaft and interconnecting said idler gear systems and said output shaft, said series of gears being equal in number to the number of idler gear systems and individually associated with a predetermined individual idler gear system.

5. A variable speed drive which comprises a housing, a gear rotatably mounted within said housing, a cylindrical sleeve eccentrically mounted on said gear with respect to the rotational axis of said gear, a motor mounted within said sleeve and with the outer surface of said motor adapted to slide with respect to the inner surface of said sleeve, an output shaft, a motor pinion, a series of first gears arranged in a common plane with said pinion and arranged for individual and selective engagement with said pinion, a series of idler shafts for carrying said first gears, a series of second gears individually mounted on said idler shafts, a third series of axially aligned gears mounted on said output shaft and individually engaging a preselected one of said second gears, and means for rotating said gear to eccentrically move said sleeve and motor to bring said pinion into engagement with a preselected one of said first gears.

6. A variable speed drive in accordance with claim 5 which further includes a planetary gear system connected to said output shaft.

7. A variable speed drive in accordance with claim 5 in which said motor is an electrical motor and which further includes electrical power wires which are connected to said motor at the axis of rotation of said motor.

References Cited by the Examiner
UNITED STATES PATENTS

| | | | |
|---|---|---|---|
| 1,793,120 | 2/1931 | Morell | 74—353 |
| 3,113,468 | 12/1963 | Humphrey | 74—353 |

DON A. WAITE, *Primary Examiner.*